(12) United States Patent
Ballas (10) Patent No.: US 9,468,983 B2
(45) Date of Patent: Oct. 18, 2016

(54) ROTARY CUTTING TOOL AND REVERSIBLE CUTTING INSERT HAVING VARIABLE-WIDTH MINOR RELIEF SURFACES THEREFOR

(71) Applicant: Iscar, Ltd., Tefen (IL)

(72) Inventor: Assaf Ballas, Akko (IL)

(73) Assignee: Iscar, Ltd., Tefen (IL)

( * ) Notice: Subject to any disclaimer, the term of this patent is extended or adjusted under 35 U.S.C. 154(b) by 243 days.

(21) Appl. No.: 14/492,761

(22) Filed: Sep. 22, 2014

(65) Prior Publication Data

US 2016/0082528 A1 Mar. 24, 2016

(51) Int. Cl.
*B23C 5/06* (2006.01)
*B23C 5/20* (2006.01)

(52) U.S. Cl.
CPC .............. *B23C 5/207* (2013.01); *B23C 5/06* (2013.01); *B23B 2200/3681* (2013.01); *B23C 2200/0483* (2013.01); *B23C 2200/201* (2013.01); *B23C 2200/206* (2013.01); *B23C 2200/208* (2013.01); *B23C 2200/286* (2013.01)

(58) Field of Classification Search
CPC . B23C 5/207; B23C 5/06; B23C 2200/0477; B23C 2200/201; B23C 2200/208; B23C 2200/28; B23C 2200/283; B23C 2200/286
See application file for complete search history.

(56) References Cited

U.S. PATENT DOCUMENTS

| | | | |
|---|---|---|---|
| 3,229,349 A | 1/1966 | Leksell | |
| 3,955,259 A | 5/1976 | Gustafsson | |
| 4,318,644 A | 3/1982 | Seidel | |
| 6,921,233 B2 | 7/2005 | Duerr et al. | |
| 7,118,312 B2 | 10/2006 | Norström et al. | |
| 8,491,234 B2 * | 7/2013 | Fang | B23C 5/109 407/113 |
| 8,511,943 B2 | 8/2013 | Gustavsson | |
| 8,556,546 B2 * | 10/2013 | Smilovici | B23C 5/06 407/114 |
| 8,708,616 B2 | 4/2014 | Smilovici et al. | |
| 8,915,681 B2 * | 12/2014 | Ishi | B23C 5/06 407/113 |
| 2010/0266353 A1 | 10/2010 | Zitzlaff et al. | |
| 2013/0004251 A1 | 1/2013 | Hausmann et al. | |

(Continued)

FOREIGN PATENT DOCUMENTS

| | | |
|---|---|---|
| GB | 1171671 | 1/1967 |
| GB | 1171671 | 11/1969 |

OTHER PUBLICATIONS

International Search Report dated Dec. 16, 2015, issued in PCT counterpart application No. PCT/IL2015/050818.

*Primary Examiner* — Sunil K Singh
*Assistant Examiner* — Alan Snyder
(74) *Attorney, Agent, or Firm* — Womble Carlyle (57) ABSTRACT

In a rotary cutting tool used for milling operations, a reversible cutting insert is removably secured in a cutting body. The cutting insert has two opposing end surfaces interconnected by a continuous peripheral surface, which includes three side surfaces alternating with three corner surfaces. The side and corner surfaces intersect with both end surfaces at side and corner edges, respectively, with each side edge having a major cutting edge, and each corner edge having a corner and minor cutting edge. Each minor cutting edge has a projected minor cutting length, in an end view, and each associated minor relief surface has a minor relief width between two lateral boundary points contained in a horizontal plane, varying with an offset distance between the horizontal plane and a median plane. Each projected minor cutting length is greater than the maximum minor relief width of its associated minor relief surface.

20 Claims, 6 Drawing Sheets

(56) References Cited

U.S. PATENT DOCUMENTS

2013/0129432 A1* 5/2013 Jaeger ............... B23C 5/207 407/42

2015/0190868 A1* 7/2015 Koifman ............... B23C 5/207 407/11

* cited by examiner

ROTARY CUTTING TOOL AND REVERSIBLE CUTTING INSERT HAVING VARIABLE-WIDTH MINOR RELIEF SURFACES THEREFOR

FIELD OF THE INVENTION

The present invention relates to cutting inserts and cutting tools for use in metal cutting processes, in general, and to rotary cutting tools having reversible cutting inserts for milling operations, in particular.

BACKGROUND OF THE INVENTION

Within the field of rotary cutting tools used in milling operations, there are many examples of reversible cutting inserts being removably secured in a cutting body. In some instances, these cutting tools are configured to perform square shoulder milling operations.

US 2013/0004251 discloses an indexable insert having a triangular shape with a top surface and a bottom surface, as well as a circumferential surface which connects said surfaces, and cutting edges around the corners. Main cutting edges are present on the top surface and on the bottom surface along the longitudinal edges. Each main cutting edge has a shorter secondary cutting edge, only associated with that main cutting edge. The secondary cutting edges, figuratively speaking, are formed by trimming the corners in each case proceeding from the top surface and the bottom surface. The secondary cutting edges adjoin two main cutting edges and extend at different angles with respect to the same.

U.S. Pat. No. 8,708,616, commonly owned with the present invention, discloses a reversible cutting insert having two opposing end surfaces interconnected by a continuous peripheral surface, including three side surfaces alternating with three corner surfaces. The side and corner surfaces intersect with both end surfaces at side and corner edges, respectively, with each side edge having a major cutting edge, and each corner edge having a corner and minor cutting edge. Each major and minor cutting edge slopes away from first and second end points, respectively, of its mutually associated corner cutting edge, towards a median plane. A minor relief surface associated with each minor cutting edge is perpendicular to the median plane and has a constant width.

SUMMARY OF THE INVENTION

In accordance with one aspect of the present invention, there is provided a reversible cutting insert, comprising:

opposing first and second end surfaces interconnected by a continuous peripheral surface, with a median plane located between the first and second end surfaces and intersecting the peripheral surface to form an insert boundary line, and an insert axis perpendicular to the median plane about which the cutting insert is indexable, the peripheral surface including three side surfaces alternating with three corner surfaces, the side and corner surfaces intersecting both the first and second end surfaces at side and corner edges, respectively, with each side edge having a major cutting edge, and each corner edge having a corner and minor cutting edge, and each corner surface having two minor relief surfaces, each minor relief surface extending away from its associated minor cutting edge, wherein a first imaginary straight line extending perpendicular to the median plane and intersecting any one of the corner cutting edges at any point along its length, passes through the median plane inside the insert boundary line, and wherein:

each minor cutting edge has a projected minor cutting length, in an end view of the cutting insert along the insert axis, each minor relief surface has a minor relief width between two lateral boundary points of the minor relief surface contained in a horizontal plane perpendicular to the insert axis, the minor relief width varying with an offset distance between the horizontal plane and the median plane, and each projected minor cutting length is greater than the maximum minor relief width of its associated minor relief surface.

In accordance with another aspect of the invention, there is provided a cutting tool rotatable about a tool axis, comprising a cutting body having an insert receiving pocket, and at least one reversible indexable cutting insert of the sort described above removably secured in the insert receiving pocket.

BRIEF DESCRIPTION OF THE DRAWINGS

For a better understanding, the invention will now be described, by way of example only, with reference to the accompanying drawings in which chain-dash lines represent cut-off boundaries for partial views of a member and in which:

FIG. 3b is a detailed corner side view of the cutting insert shown in FIG. 3a;

DETAILED DESCRIPTION OF THE INVENTION

Figure 1:
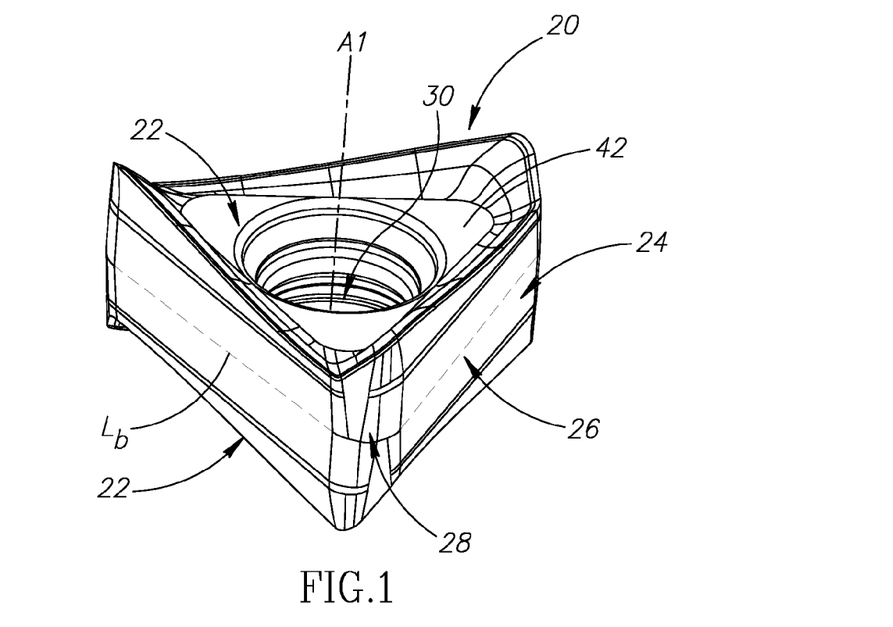
FIG. 1 is a perspective view of a cutting insert in accordance with some embodiments of the present invention.
Figure 2A:
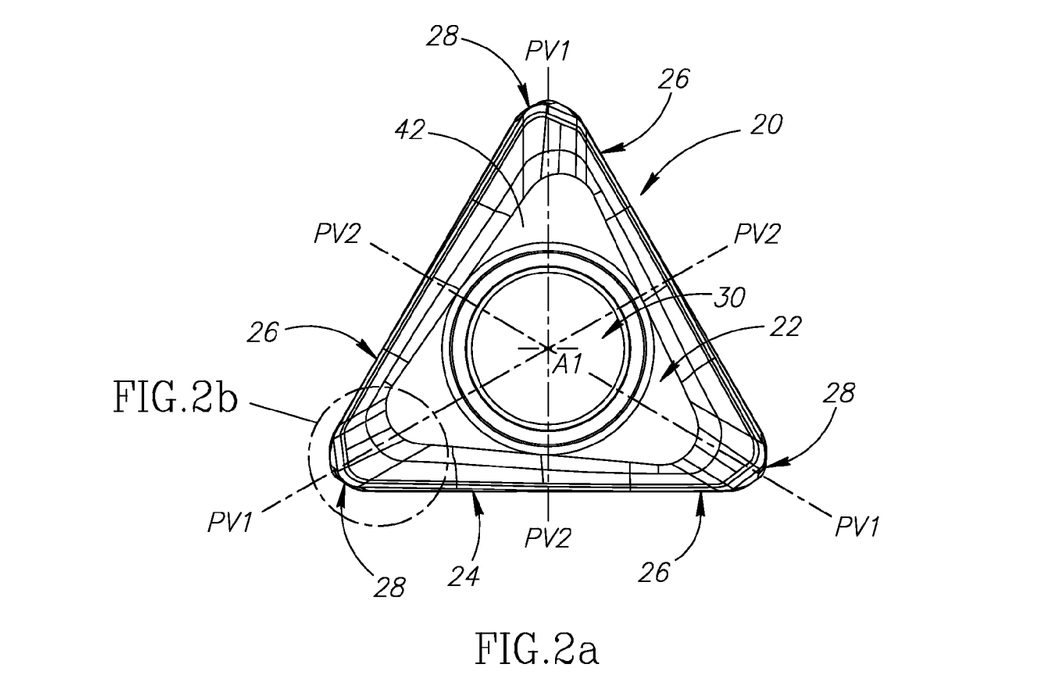
FIG. 2a is an end view of the cutting insert shown in FIG. 1.

The present invention relates to a reversible cutting insert 20, as shown in FIGS. 1 and 2a, having opposing first and second end surfaces 22 interconnected by a continuous peripheral surface 24, the peripheral surface 24 including three side surfaces 26 alternating with three corner surfaces 28.

In some embodiments of the present invention, the cutting insert 20 may preferably be manufactured by form pressing and sintering a cemented carbide, such as tungsten carbide, and may be coated or uncoated.

Figure 3A:
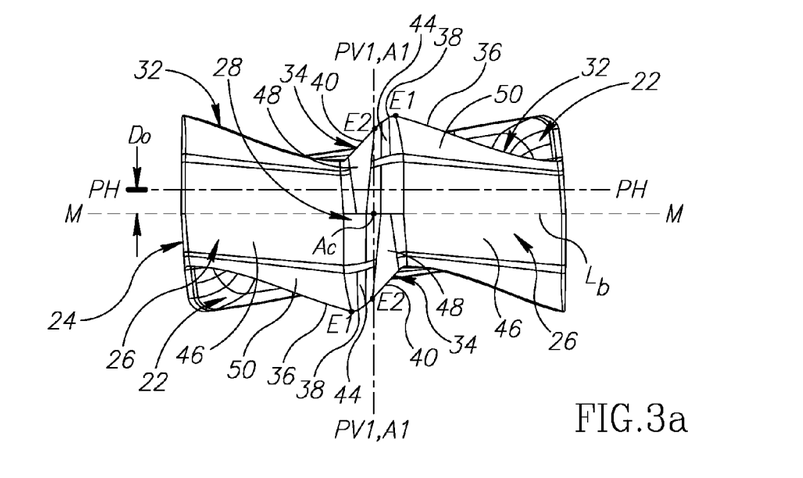
FIG. 3a is a corner side view of the cutting insert shown in FIG. 2a, viewed along a first vertical plane PV1.
Figure 4:
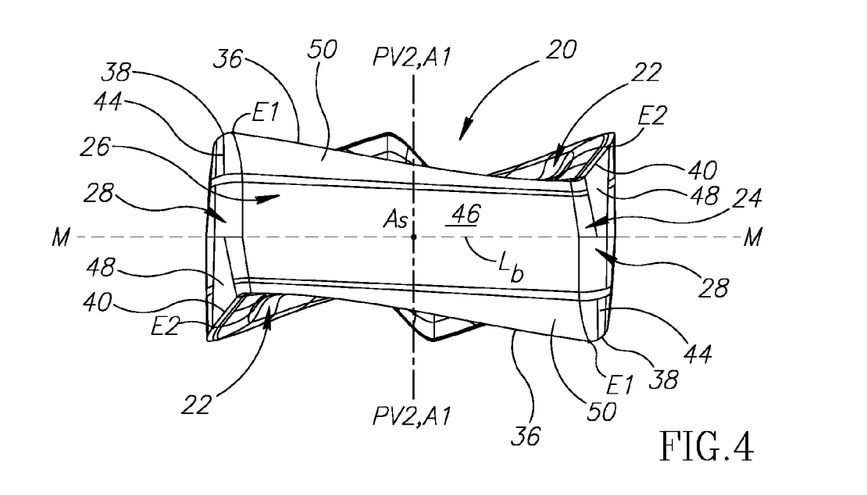
FIG. 4 is a side view of the cutting insert shown in FIG. 2a, viewed along a second vertical plane PV2.

As shown in FIGS. 3a and 4, the cutting insert 20 has a median plane M located between the first and second end surfaces 22 and intersecting the peripheral surface 24 to form an insert boundary line Lb.

In some embodiments of the present invention, the cutting insert 20 may be configured such that in an end view, as shown in FIG. 2a, no portion of the cutting insert 20 extends beyond the insert boundary line Lb.

As shown in FIGS. 3a and 4, the cutting insert 20 has an insert axis A1 perpendicular to the median plane M about which the cutting insert 20 is indexable.

In some embodiments of the present invention, a through bore 30 coaxial with the insert axis A1 may extend between and open out at both the first and second end surfaces 22.

Also in some embodiments of the present invention, the three side surfaces 26 may be identical, and the three corner surfaces 28 may be identical.

Further, in some embodiments of the present invention, the peripheral surface 24 may have exactly three side surfaces 26 alternating with exactly three corner surfaces 28, and the cutting insert 20 may exhibit three-fold rotational symmetry about the insert axis A1.

As shown in FIG. 2a, the cutting insert 20 may have the basic shape of an equilateral triangle, in an end view.

In some embodiments of the present invention, the cutting insert 20 may be manufactured by direct pressing along the direction of the insert axis A1.

Also in some embodiments of the present invention, the cutting insert 20 may be pressed into its final shape, and the peripheral surface 24 may be unground.

As shown in FIGS. 3a and 4, the side and corner surfaces 26, 28 intersect with both the first and second end surfaces 22 at side and corner edges 32, 34, respectively, with each side edge 32 having a major cutting edge 36, and each corner edge 34 having a corner and minor cutting edge 38, 40.

Thus, the cutting insert 20 is advantageously configured with two major cutting edges 36 per side surface 26, and two corner and minor cutting edges 38, 40 per corner surface 28, and thus for embodiments exhibiting three-fold rotational symmetry about the insert axis A1, the cutting insert 20 has a total of six major, corner and minor cutting edges 36, 38, 40.

Figure 2B:
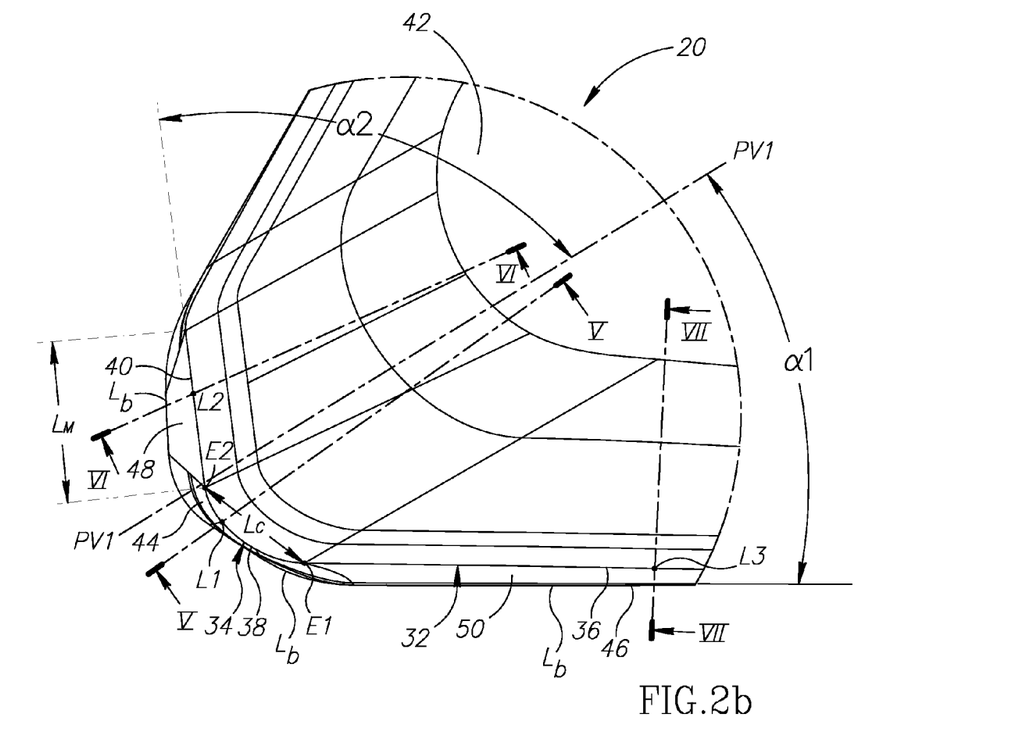
FIG. 2b is a detailed end view of the cutting insert shown in FIG. 1.

In some embodiments of the present invention, as shown in FIGS. 2a and 2b, in an end view of the cutting insert 20 along the insert axis A1, each corner cutting edge 38 may be curved and each minor cutting edge 40 may be straight.

Also in some embodiments of the present invention, the first and second end surfaces 22 may be identical, each having a support surface 42 substantially parallel to the median plane M.

Further, in some embodiments of the present invention, the two support surfaces 42 may be equidistant from the median plane M.

Figures 5, 6, 7:
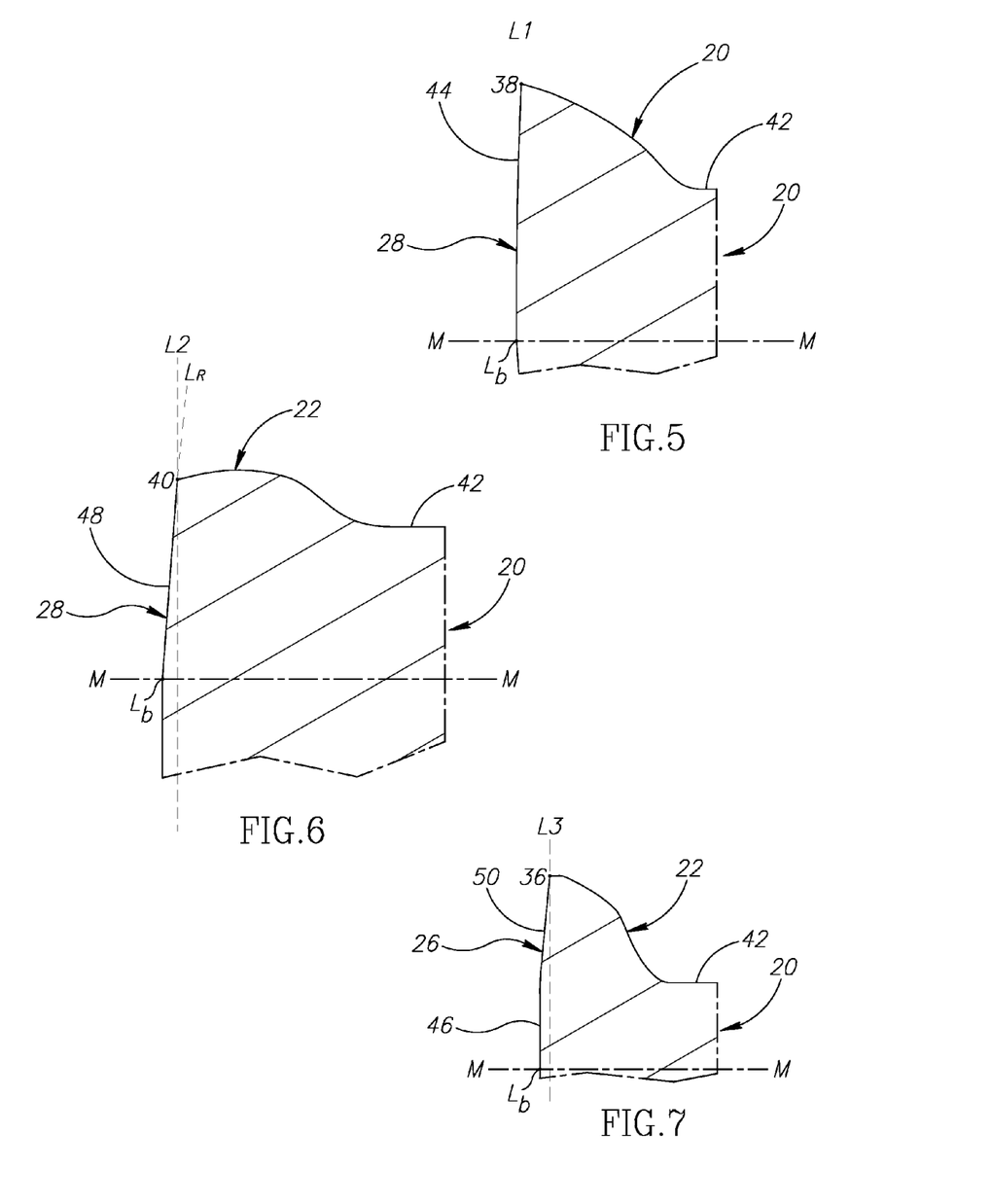
FIG. 5 is a partial cross-sectional view of the cutting insert shown in FIG. 2b, taken along the line V-V.
FIG. 6 is a partial cross-sectional view of the cutting insert shown in FIG. 2b, taken along the line VI-VI.
FIG. 7 is a partial cross-sectional view of the cutting insert shown in FIG. 2b, taken along the line VII-VII.
Figure 8:
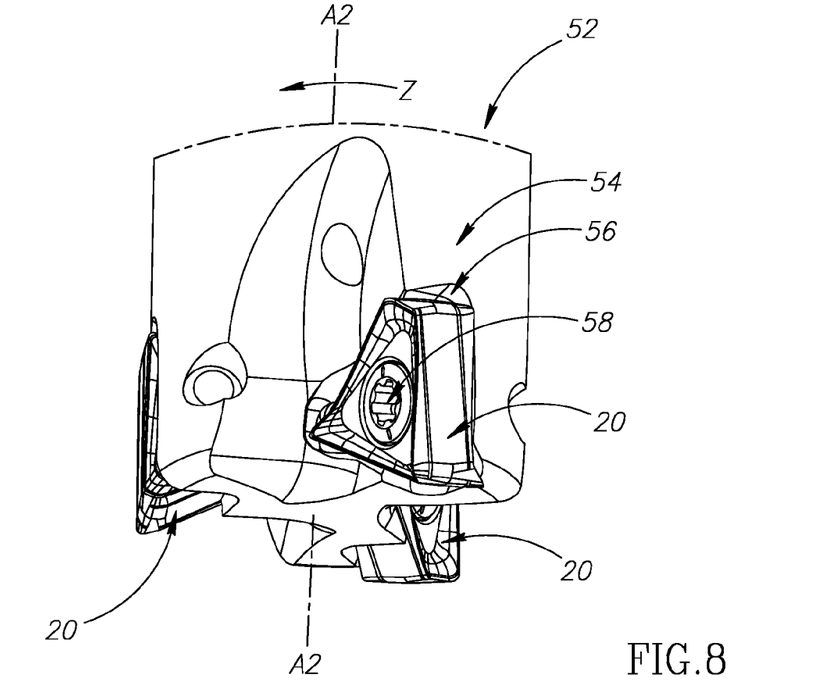
FIG. 8 is a perspective view of a cutting tool in accordance with some embodiments of the present invention.

As shown in FIG. 5, each corner cutting edge 38 may be entirely located further from the median plane M than each of the support surfaces 42.

In some embodiments of the present invention, each corner surface 28 may include two partially conical shaped corner relief surfaces 44, each corner relief surface 44 extending away from its associated corner cutting edge 38.

It should be appreciated that each partially conical shaped corner relief surface 44, also known as a 'reversed' relief surface, generally extends outwardly (i.e., in a direction away from the insert axis A1) from its associated corner cutting edge 38 towards the median plane M, so that each corner cutting edge 38 is beneficially supported and advantageously robust.

As shown in FIGS. 2b and 5, a first imaginary straight line L1 extending perpendicular to the median plane M and intersecting any one of the corner cutting edges 38 at any point along its length, passes through the median plane M inside the insert boundary line Lb.

It should be appreciated that the first imaginary straight line L1 appears as a point in an end view of the cutting insert 20, as shown in FIG. 2b.

As shown in FIG. 2a, each corner surface 28 is bisected by a first vertical plane PV1 containing the insert axis A1, and each side surface 26 is bisected by a second vertical plane PV2 containing the insert axis A1.

In some embodiments of the present invention, each first vertical plane PV1 may be coplanar with one of the second vertical planes PV2.

Also in some embodiments of the present invention, each side surface 26 may have a planar side median region 46 perpendicular to the median plane M. As seen in FIG. 2b, each side median region 46 may form an acute first angle $\alpha d$ with the first vertical plane PV1 of an adjacent corner surface 28, and the first angle $\alpha d$ may have a value of 30°.

Further, in some embodiments of the present invention, each minor cutting edge 40 may form an acute second angle $\alpha 2$ with its associated first vertical plane PV1 (see FIG. 2b), and the second angle $\alpha 2$ may have a value of between 60° and 80°.

As shown in FIGS. 3 and 4, respectively, the median plane M intersects each first vertical plane PV1 to form a corner axis Ac, and the median plane M intersects each second vertical plane PV2 to form a side axis As.

In some embodiments of the present invention, each corner surface 28 may exhibit two-fold rotational symmetry about its associated corner axis Ac.

Also in some embodiments of the present invention, each side surface 26 may exhibit two-fold rotational symmetry about its associated side axis As.

Figure 3B:
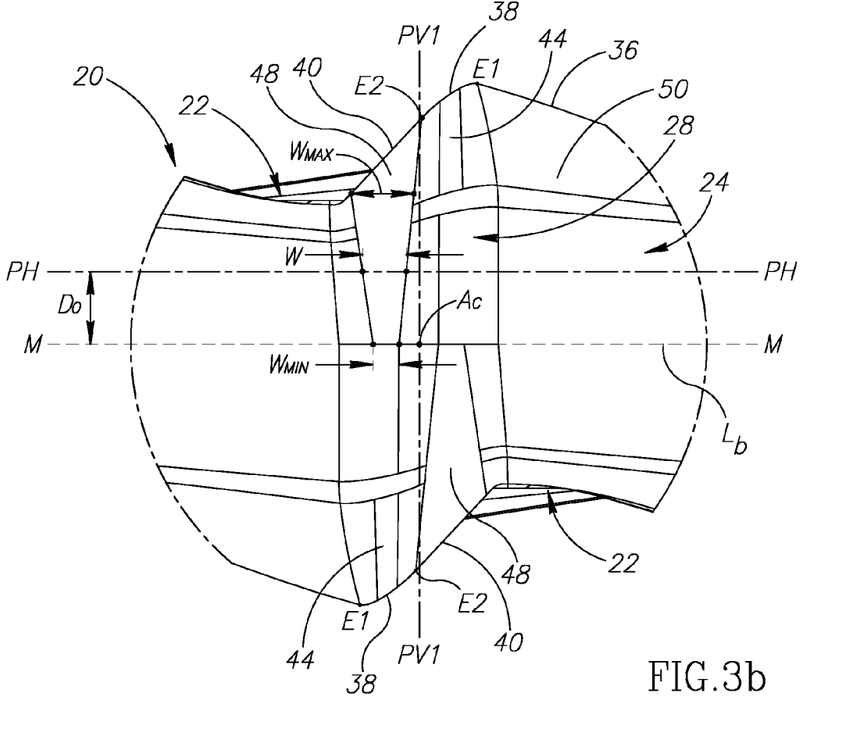

As shown in FIG. 3b, each corner surface 28 has two minor relief surfaces 48, each minor relief surface 48 extending away from its associated minor cutting edge 40 and having a minor relief width W between two lateral boundary points of the minor relief surface 48 contained in a horizontal plane PH perpendicular to the insert axis A1.

It should be appreciated that the lateral boundary points of the minor relief surface 48 are points which laterally border other sub-surfaces of the peripheral surface 24.

In some embodiments of the present invention, as shown in FIG. 6, an imaginary straight relief line $L_R$ coplanar with the insert axis A1 and tangential to any point on or coincident with each minor relief surface 48 may converge towards the insert axis A1 in the same direction that its associated end surface 22 faces. Thus, each minor relief surface 48, also known as a 'reversed' relief surface, is beneficially supported and advantageously robust.

As shown in FIGS. 2b and 6, a second imaginary straight line L2 extending perpendicular to the median plane M and intersecting any one of the minor cutting edges 40 at any point along its length, may pass through the median plane M inside the insert boundary line Lb.

It should be appreciated that the second imaginary straight line L2 appears as a point in an end view of the cutting insert 20, as shown in FIG. 2b.

In some embodiments of the present invention, each minor relief surface 48 may be planar.

Also in some embodiments of the present invention, the two minor relief surfaces 48 associated with each corner surface 28 may be spaced apart.

In an end view of the cutting insert 20 along the insert axis A1, as shown in FIG. 2b, each minor cutting edge 40 has a projected minor cutting length $L_M$.

It should be appreciated that the projected minor cutting length $L_M$ of each minor cutting edge 40 is the shortest distance measured between its two end points, when projected onto an imaginary plane perpendicular to the insert axis A1.

According to the present invention, the minor relief width W varies with an offset distance Do between the horizontal plane PH and the median plane M, and each projected minor cutting length $L_M$ is greater than the maximum minor relief width $W_{MAX}$ of its associated minor relief surface 48. This contrasts with the aforementioned U.S. Pat. No. 8,708,616, in which the minor relief surfaces associated with each minor cutting edge has a constant width.

In some embodiments of the present invention, the minor relief width W varies continuously with the offset distance Do, while in a subset of these embodiments the minor relief width W varies continuously linearly with the offset distance Do.

It should be appreciated that each minor cutting edge 40 can also be referred to as a wiper, and by configuring the projected minor cutting length $L_M$ of each minor cutting edge 40 to be greater than the maximum minor relief width $W_{MAX}$ of its associated minor relief surface 48, promotes improved surface finish of a workpiece being machined using the cutting insert 20.

In some embodiments of the present invention, the minor relief width W may increase as the offset distance Do increases.

It should be appreciated that by configuring the minor relief width W to increase as the offset distance Do increases, advantageously results in a compact minor relief surface 48 and a relatively long minor cutting edge 40 or wiper.

Also, in some embodiments of the present invention, the minimum minor relief width $W_{MIN}$ of each minor relief surface 48 may occur at an offset distance Do having a value equal to zero.

As shown in FIG. 3, each corner cutting edge 38 extends between first and second end points E1, E2.

In some embodiments of the present invention, each corner cutting edge 38 may have a projected corner cutting length Lc, in an end view of the cutting insert 20 along the insert axis A1, as shown in FIG. 2b, and the projected minor cutting length $L_M$ of each minor cutting edge 40 may be greater than the projected corner cutting length Lc of its associated corner cutting edge 38.

It should be appreciated that the projected corner cutting length Lc of each corner cutting edge 38 is the shortest distance measured between its first and second end points E1, E2, when projected onto an imaginary plane perpendicular to the insert axis A1.

In some embodiments of the present invention, as shown in FIGS. 2b and 3b, each second end point E2 may be coincident with an end point of its associated minor cutting edge 40.

Also in some embodiments of the present invention, as shown in FIG. 3b, each major and minor cutting edge 36, 40 may slope away from the first and second end points E1, E2, respectively, of an associated corner cutting edge 38, towards the median plane M.

Further, in some embodiments of the present invention, each major cutting edge 36 may slope away from its mutually associated corner cutting edge 38 towards the median plane M along its entire length.

Yet further, in some embodiments of the present invention, each major cutting edge 36 may intersect its associated second vertical plane PV2. For these embodiments, it can be understood that each major cutting edge 36 extends along greater than half the peripheral length of its associated side surface 26.

Yet still further, in some embodiments of the present invention, each major cutting edge 36 may include a straight portion, merging with its associated corner cutting edge 38, at the first end point E1.

As shown in FIG. 4, each side surface 26 has two major relief surfaces 50, each major relief surface 50 extending away from its associated major cutting edge 36.

It should be appreciated that each major relief surface 50, also known as a 'reversed' relief surface, generally extends outwardly (i.e., in a direction away from the insert axis A1) from its associated major cutting edge 36 towards the median plane M, so that each major cutting edge 36 is beneficially supported and advantageously robust.

As shown in FIGS. 2b and 7, a third imaginary straight line L3 extending perpendicular to the median plane M and intersecting any one of the major cutting edges 36 at any point along its length, may pass through the median plane M inside the insert boundary line Lb.

It should be appreciated that the third imaginary straight line L3 appears as a point in an end view of the cutting insert 20, as shown in FIG. 2b.

As shown in FIG. 3b, each minor cutting edge 40 may slope away from its mutually associated corner cutting edge 38 towards the median plane M along its entire length.

In some embodiments of the present invention, as shown in FIG. 3b, each minor cutting edge 40 may intersect its associated first vertical plane PV1.

Also in some embodiments of the present invention, the two corner cutting edges 38 associated with each corner surface 28 may each be entirely located on opposite sides of the associated first vertical plane PV1.

As shown in FIGS. 8 to 11, the present invention also relates to a cutting tool 52 rotatable about a tool axis A2, in a direction of rotation Z, having a cutting body 54 and at least one of the aforementioned reversible cutting inserts 20. Each cutting insert 20 is removably secured in an insert receiving pocket 56 of the cutting body 54.

In some embodiments of the present invention, each cutting insert 20 may be removably secured in the insert receiving pocket 56 by means of a clamping screw 58 passing through its through bore 30, and threadingly engaging a screw bore (not shown) in a seating surface (not shown) of the insert receiving pocket 56.

Figure 11:
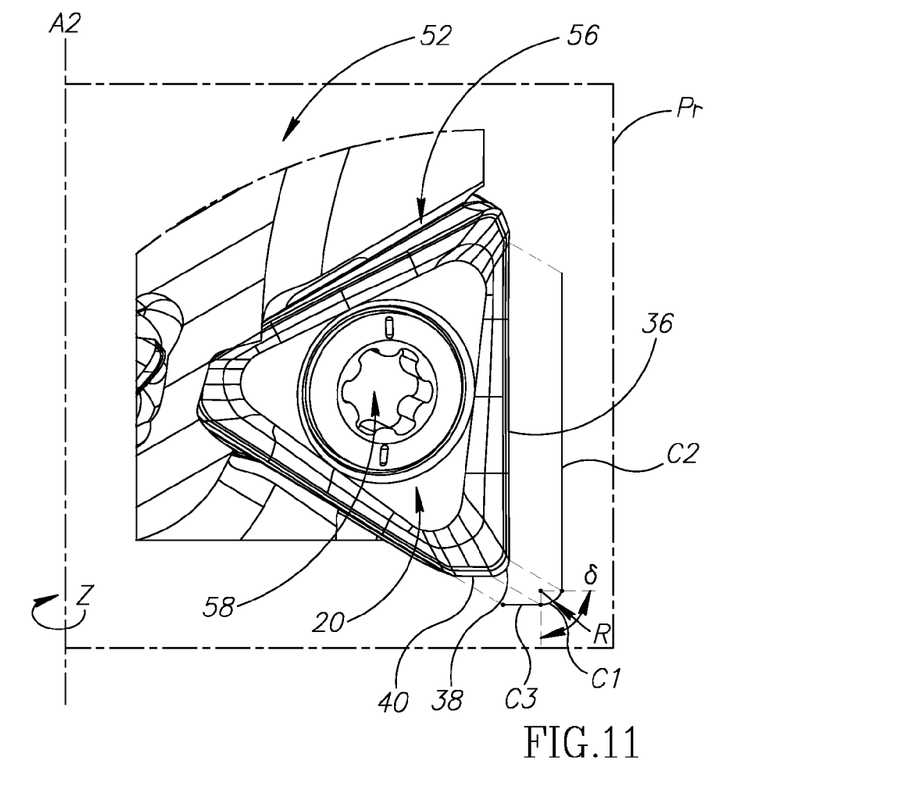
FIG. 11 is a diagrammatical representation of the contour lines inscribed by the operative cutting edges of the cutting tool shown in FIG. 10, in a radial plane Pr.

As shown in FIG. 11, each cutting insert 20 may be configured within the cutting tool 52 so that during rotation of the cutting tool 52 about its tool axis A2, the operative corner cutting edge 38 inscribes an arc-shaped first contour line C1 in a radial plane Pr containing the tool axis A2, with the first contour line C1 having a constant radius of curvature R subtending a corner cutting angle δ of 90°.

Also, as shown in FIG. 11, each cutting insert 20 may be configured within the cutting tool 52 so that during rotation of the cutting tool 52 about its tool axis A2, the operative major and minor cutting edges 36, 40 inscribe straight second and third contour lines C2, C3, respectively, in the radial plane Pr, with the second contour line C2 substantially parallel to the tool axis A2 and the third contour line C3 substantially perpendicular to the tool axis A2.

Throughout the description, it should be appreciated that the parallelity and perpendicularity of the second and third contour lines C2, C3, respectively, with respect to the tool axis A2 have an accuracy tolerance of 0.5°.

In some embodiments of the present invention, the rotary cutting tool 52 may be used for milling operations.

It should be appreciated that during a milling operation, the operative corner cutting edge 38 cuts a corner in a workpiece (not shown) having a constant radius of curvature R subtending a corner cutting angle δ of 90°, advantageously resulting in reduced stress concentrations at the corner, and thus minimizing its risk of fracture.

It should also be appreciated that during a milling operation, the major 'reversed' relief surfaces 50 beneficially provide the trailing non-operative major cutting edges 36 of each reversible cutting insert 20 with greater clearance from the workpiece, thus advantageously enabling their arrangement on relatively smaller diameter cutting tools 52.

In some embodiments of the present invention, as can be readily understood from FIG. 11, each cutting insert 20 may be configured within the cutting tool 52, so that the operative major, corner and minor cutting edges 36, 38, 40 perform a square, or 90°, shoulder milling operation in the workpiece.

It should be appreciated that during a square, or 90°, shoulder milling operation, the height of the machined shoulder is not limited by the cutting insert 20.

Figure 9:
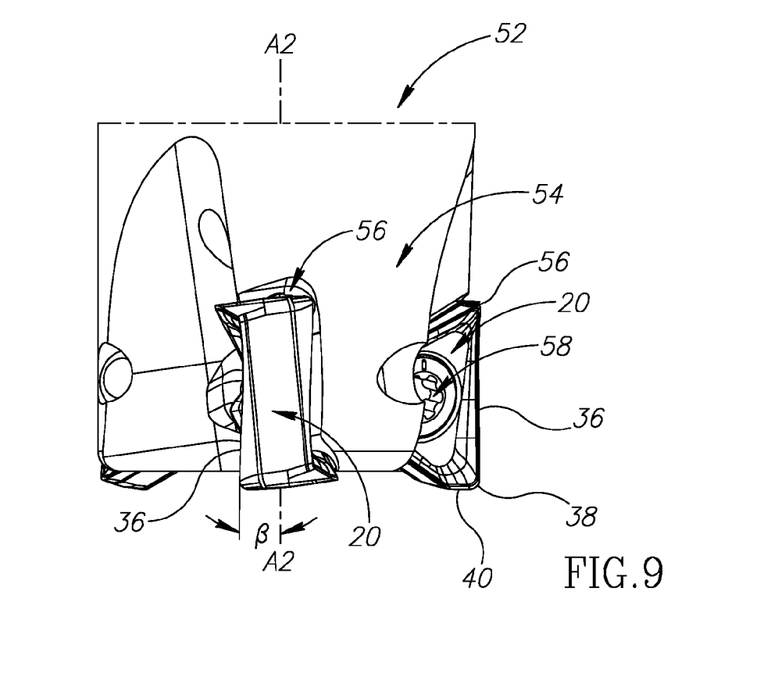
FIG. 9 is side view of the cutting tool shown in FIG. 8.
Figure 10:
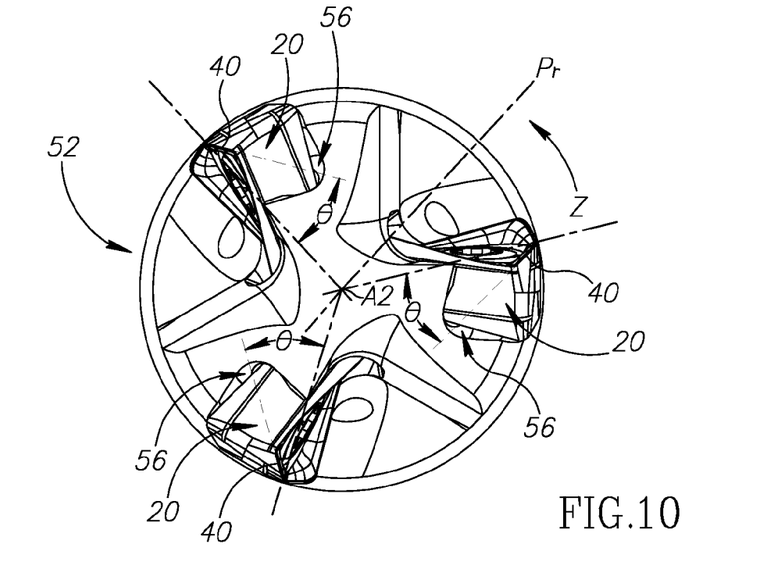
FIG. 10 is an end view of the cutting tool shown in FIG. 8.

In some embodiments of the present invention, as shown in FIGS. 9 and 10, each cutting insert 20 may be configured within the cutting tool 52, so that the operative major cutting edge 36 has a positive axial rake angle β, and the operative minor cutting edge 40 has a positive radial rake angle θ.

It should be appreciated that by providing the operative major and minor cutting edges 36, 40 with positive axial and radial rake angles β, θ, respectively, lower cutting forces are generated, the machine spindle requires less operating power, and the workpiece undergoes a smoother cutting action. Also the cutting chips produced are advantageously evacuated way from the operative cutting edges.

Although the present invention has been described to a certain degree of particularity, it should be understood that various alterations and modifications could be made without departing from the spirit or scope of the invention as hereinafter claimed.

What is claimed is:

1. A reversible cutting insert (20), comprising:
    opposing first and second end surfaces (22) interconnected by a continuous peripheral surface (24), with a median plane (M) located between the first and second end surfaces (22) and intersecting the peripheral surface (24) to form an insert boundary line (Lb), and an insert axis (A1) perpendicular to the median plane (M) about which the cutting insert (20) is indexable,
    the peripheral surface (24) including three side surfaces (26) alternating with three corner surfaces (28),
    the side and corner surfaces (26, 28) intersecting both the first and second end surfaces (22) at side and corner edges (32, 34), respectively, with each side edge (32) having a major cutting edge (36), and each corner edge (34) having a corner and minor cutting edge (38, 40), and
    each corner surface (28) having two minor relief surfaces (48), each minor relief surface (48) extending away from its associated minor cutting edge (40),
    wherein a first imaginary straight line (L1) extending perpendicular to the median plane (M) and intersecting any one of the corner cutting edges (38) at any point along its length, passes through the median plane (M) inside the insert boundary line (Lb), and
    wherein:
    each minor cutting edge (40) has a projected minor cutting length ($L_M$), in an end view of the cutting insert (20) along the insert axis (A1),
    each minor relief surface (48) has a minor relief width (W) between two lateral boundary points of the minor relief surface (48) contained in a horizontal plane (PH) perpendicular to the insert axis (A1), the minor relief width (W) varying with an offset distance ($D_O$) between the horizontal plane (PH) and the median plane (M), and
    each projected minor cutting length ($L_M$) is greater than the maximum minor relief width ($W_{MAX}$) of its associated minor relief surface (48).

2. The cutting insert (20) according to claim 1, wherein the minor relief width (W) increases as the offset distance ($D_O$) increases.

3. The cutting insert (20) according to claim 1, wherein the minimum minor relief width ($W_{MIN}$) of each minor relief surface (48) occurs at an offset distance ($D_O$) having a value equal to zero.

4. The cutting insert (20) according to claim 1, wherein each corner cutting edge (38) extends between first and second end points (E1, E2), and
    wherein each major and minor cutting edge (36, 40) slopes away from the first and second end points (E1, E2), respectively, of an associated corner cutting edge (38), towards the median plane (M).

5. The cutting insert (20) according to claim 4, wherein each major cutting edge (36) slopes away from the first end point (E1) towards the median plane (M) along its entire length.

6. The cutting insert (20) according to claim 5, wherein each side surface (26) is bisected by a second vertical plane (PV2) containing the insert axis (A1), and
    wherein each major cutting edge (36) intersects its associated second vertical plane (PV2).

7. The cutting insert (20) according to claim 4, wherein each minor cutting edge (40) slopes away from the second end point (E2) towards the median plane (M) along its entire length.

8. The cutting insert (20) according to claim 1, wherein each corner cutting edge (38) has a projected corner cutting length ($L_C$), in an end view of the cutting insert (20) along the insert axis (A1), and
    wherein the projected minor cutting length ($L_M$) of each minor cutting edge (40) is greater than the projected corner cutting length ($L_C$) of its associated corner cutting edge (38).

9. The cutting insert (20) according to claim 1, wherein a second imaginary straight line (L2) extending perpendicular to the median plane (M) and intersecting any one of the minor cutting edges (40) at any point along its length, passes through the median plane (M) inside the insert boundary line (Lb).

10. The cutting insert (20) according to claim 1, wherein an imaginary straight relief line ($L_R$) coplanar with the insert axis (A1) and tangential to any point on or coincident with each minor relief surface (48) converges towards the insert axis (A1) in the same direction that its associated end surface (22) faces.

11. The cutting insert (20) according to claim 1, wherein a third imaginary straight line (L3) extending perpendicular to the median plane (M) and intersecting any one of the major cutting edges (36) at any point along its length, passes through the median plane (M) inside the insert boundary line (Lb).

12. The cutting insert (20) according to claim 1, wherein each corner cutting edge (38) is curved and each minor cutting edge (40) is straight, in an end view of the cutting insert (20) along the insert axis (A1).

13. The cutting insert (20) according to claim 1, wherein each minor relief surface (48) is planar.

14. The cutting insert (20) according to claim 1, wherein the peripheral surface (24) has exactly three side surfaces (26) alternating with exactly three corner surfaces (28), and wherein the cutting insert (20) exhibits three-fold rotational symmetry about the insert axis (A1).

15. The cutting insert (20) according to claim 1, wherein each side surface (26) has a planar side median region (46) perpendicular to the median plane (M), wherein each corner surface (28) is bisected by a first vertical plane (PV1) containing the insert axis (A1), and wherein each side median region (46) forms an acute first angle ($\alpha1$) with the first vertical plane (PV1) of an adjacent corner surface (28), and the first angle ($\alpha1$) has a value of 30°.

16. The cutting insert (20) according to claim 15, wherein the two corner cutting edges (38) associated with each corner surface (28) are each entirely located on opposites sides of the associated first vertical plane (PV1).

17. The cutting insert (20) according to claim 1, wherein the peripheral surface (24) is unground.

18. The cutting insert (20) according to claim 1, wherein each corner surface (28) has two partially conical shaped corner relief surfaces (44), each corner relief surface (44) extending away from its associated corner cutting edge (38).

19. A cutting tool (52) rotatable about a tool axis (A2), comprising:
    a cutting body (54); and
    at least one reversible cutting insert (20) in accordance with claim 1 removably secured in an insert receiving pocket (56) of the cutting body (54).

20. The cutting tool (52) according to claim 19, wherein each cutting insert (20) is configured and seated so that the operative major, corner and minor cutting edges (36, 38, 40) are capable of performing a square shoulder milling operation in a workpiece.

* * * * *